US012218465B2

(12) United States Patent
Smentek et al.

(10) Patent No.: US 12,218,465 B2
(45) Date of Patent: Feb. 4, 2025

(54) COAXIAL CONNECTOR WITH QUICK LOCKING MECHANISM WITH VISUAL ASSURANCE OF LOCKING

(71) Applicant: Outdoor Wireless Networks LLC, Claremont, NC (US)

(72) Inventors: David J. Smentek, Lockport, IL (US); Amit Kaistha, Coppell, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 269 days.

(21) Appl. No.: 17/821,563

(22) Filed: Aug. 23, 2022

(65) Prior Publication Data

US 2023/0100627 A1 Mar. 30, 2023

Related U.S. Application Data

(60) Provisional application No. 63/249,694, filed on Sep. 29, 2021.

(51) Int. Cl.
*H01R 24/40* (2011.01)
*H01R 13/629* (2006.01)
(Continued)

(52) U.S. Cl.
CPC ........... *H01R 24/40* (2013.01); *H01R 13/629* (2013.01); *H01R 13/639* (2013.01); *H01R 13/622* (2013.01); *H01R 2103/00* (2013.01)

(58) Field of Classification Search
CPC ........ H01R 23/40; H01R 23/20; H01R 23/38; H01R 23/42; H01R 13/639; H01R 13/622; H01R 13/6295; H01R 2103/00
(Continued)

(56) References Cited

U.S. PATENT DOCUMENTS 3,901,574 A * 8/1975 Paullus ................ H01R 13/623 285/401
3,953,099 A * 4/1976 Wilson ............... H01R 13/5221 439/279

(Continued)

FOREIGN PATENT DOCUMENTS

KR 20100083352 A 7/2010
WO 2012071086 A1 5/2012

OTHER PUBLICATIONS

"International Search Report and Written Opinion corresponding International Application No. PCT/US2022/075106 mailed Nov. 28, 2022".

(Continued)

*Primary Examiner* — Harshad C Patel
(74) *Attorney, Agent, or Firm* — Myers Bigel, P.A.

(57) ABSTRACT

A connector assembly includes: a first connector having a first outer body, the first outer body including visual indicia on an outer surface thereof, the first outer body including first locking features; and a second connector having a second outer body and a coupling sleeve that is slidable axially relative to the outer body, the second connector including second locking features. The first connector is configured for mating with the second connector. When the first and second connectors are mated, the coupling sleeve is movable between an unlocked position, in which the first and second locking features are not engaged and the first and second connectors can be unmated, and a locked position, in which the coupling sleeve causes engagement of the first and second locking features, thereby preventing unmating of the first and second connectors. In the unlocked position, the coupling sleeve does not overlie the visual indicia, such that the visual indicia is visible, and in the locked position, the
(Continued)

coupling sleeve overlies the visual indicia, such that the visual indicia is obscured from view.

20 Claims, 4 Drawing Sheets

(51) Int. Cl.
*H01R 13/639* (2006.01)
*H01R 13/622* (2006.01)
*H01R 103/00* (2006.01)

(58) Field of Classification Search
USPC .......... 439/488
See application file for complete search history.

(56) References Cited

U.S. PATENT DOCUMENTS

| | | | | | |
|---|---|---|---|---|---|
| 4,059,324 | A * | 11/1977 | Snyder | H01R 13/623 | 439/321 |
| 4,534,607 | A * | 8/1985 | Tomsa | H01R 13/641 | 439/312 |
| 5,662,488 | A * | 9/1997 | Alden | H01R 13/625 | 439/314 |
| 6,010,348 | A * | 1/2000 | Alden | H01R 13/506 | 439/681 |
| 6,162,082 | A * | 12/2000 | Karsten | H01R 13/523 | 439/321 |
| 6,645,011 | B2 | 11/2003 | Schneider et al. | | |
| 7,195,505 | B1 * | 3/2007 | Becker | H01R 13/5219 | 439/282 |
| 7,503,794 | B2 * | 3/2009 | Haller | H01R 13/633 | 439/357 |
| 7,972,158 | B2 | 7/2011 | Wild et al. | | |
| 8,215,977 | B2 * | 7/2012 | Zapf | H01R 13/625 | 439/352 |
| 8,337,228 | B1 * | 12/2012 | Montena | H01R 13/5219 | 277/609 |
| 9,368,907 | B2 * | 6/2016 | Becker | H01R 13/504 | |
| 9,437,961 | B1 * | 9/2016 | Smajda | H01R 13/28 | |
| 9,893,466 | B2 | 2/2018 | Wu et al. | | |
| 11,081,838 | B2 * | 8/2021 | Wendt | H01R 13/639 | |
| 2003/0027435 | A1 | 2/2003 | Schneider et al. | | |
| 2008/0014778 | A1 | 1/2008 | Norwood et al. | | |
| 2018/0248314 | A1 | 8/2018 | Wu et al. | | |

OTHER PUBLICATIONS

International Preliminary Report on Patentability corresponding to PCT/US2022/075106; mailed Apr. 11, 2024, (8 pages).

* cited by examiner

COAXIAL CONNECTOR WITH QUICK LOCKING MECHANISM WITH VISUAL ASSURANCE OF LOCKING

RELATED APPLICATION

The present application claims priority from and the benefit of U.S. Provisional Patent Application No. 63/249,694, filed Sep. 29, 2021, the disclosure of which is hereby incorporated herein by reference in full.

FIELD OF THE INVENTION

The present invention relates to a coaxial connector, and in particular, to a coaxial connector with a quick locking and separating mechanism.

BACKGROUND OF THE INVENTION

Coaxial connectors, especially radio frequency coaxial connectors, are widely used in various industries, and in particular telecommunications, for connecting coaxial cables. A typical coaxial connector interface relies on a threaded connection, wherein a first one of the connectors has an outer thread and a mating connector includes a coupling nut that rotates relative to the remainder of the connector. Inner threads on the coupling nut mesh with the outer threads of the first connector to provide a reliable connection for the connectors.

Although the reliability of threaded connections is relatively high, this interconnection arrangement can be tedious, and it may require a certain amount of space around the connector to use a tool to rotate the coupling nut to a sufficient torque for connection. As a result, some connectors rely on a quick-lock or push-pull type of mechanism for interconnection. One exemplary quick-lock mechanism is illustrated and discussed in U.S. Pat. No. 9,893,466 to Wu et al., the disclosure of which is hereby incorporated by reference herein. Other quick-lock mechanisms are shown in U.S. Pat. No. 6,645,011 to Schneider and U.S. Pat. No. 7,972,158 to Wild, the disclosures of each of which are hereby incorporated herein.

It may be desirable to provide additional configurations for quick-lock coaxial connectors.

SUMMARY

As a first aspect, embodiments of the invention are directed to a connector assembly. The assembly comprises: a first connector having a first outer body, the first outer body including visual indicia on an outer surface thereof, the first outer body including first locking features; and a second connector having a second outer body and a coupling sleeve that is slidable axially relative to the outer body, the second connector including second locking features. The first connector is configured for mating with the second connector. When the first and second connectors are mated, the coupling sleeve is movable between an unlocked position, in which the first and second locking features are not engaged and the first and second connectors can be unmated, and a locked position, in which the coupling sleeve causes engagement of the first and second locking features, thereby preventing unmating of the first and second connectors. In the unlocked position, the coupling sleeve does not overlie the visual indicia, such that the visual indicia is visible, and in the locked position, the coupling sleeve overlies the visual indicia, such that the visual indicia is obscured from view.

As a second aspect, embodiments of the invention are directed to a connector assembly comprising: a first connector mounted on a piece of telecommunications equipment and having a first outer body, the first outer body including visual indicia on an outer surface thereof, the first outer body including first locking features; and a second connector terminating a cable and having a second outer body and a coupling sleeve that is slidable axially relative to the outer body, the second connector including second locking features. The first connector is configured for mating with the second connector. When the first and second connectors are mated, the coupling sleeve is movable between an unlocked position, in which the first and second locking features are not engaged and the first and second connectors can be unmated, and a locked position, in which the coupling sleeve causes engagement of the first and second locking features, thereby preventing unmating of the first and second connectors. In the unlocked position, the coupling sleeve does not overlie the visual indicia, such that the visual indicia is visible, and in the locked position, the coupling sleeve overlies the visual indicia, such that the visual indicia is obscured from view.

As a third aspect, embodiments of the invention are directed to a connector assembly comprising: a first connector mounted on a piece of telecommunications equipment and having a first outer body, the first outer body including visual indicia on an outer surface thereof, the visual indicia being of different color than the outer surface of the first outer body, the first outer body including first locking features; and a second connector having a second outer body and a coupling sleeve that is slidable axially relative to the outer body, the second connector including second locking features. The first connector is configured for mating with the second connector. When the first and second connectors are mated, the coupling sleeve is movable between an unlocked position, in which the first and second locking features are not engaged and the first and second connectors can be unmated, and a locked position, in which the coupling sleeve causes engagement of the first and second locking features, thereby preventing unmating of the first and second connectors. In the unlocked position, the coupling sleeve does not overlie the visual indicia, such that the visual indicia is visible, and in the locked position, the coupling sleeve overlies the visual indicia, such that the visual indicia is obscured from view.

DETAILED DESCRIPTION

Figure 1:
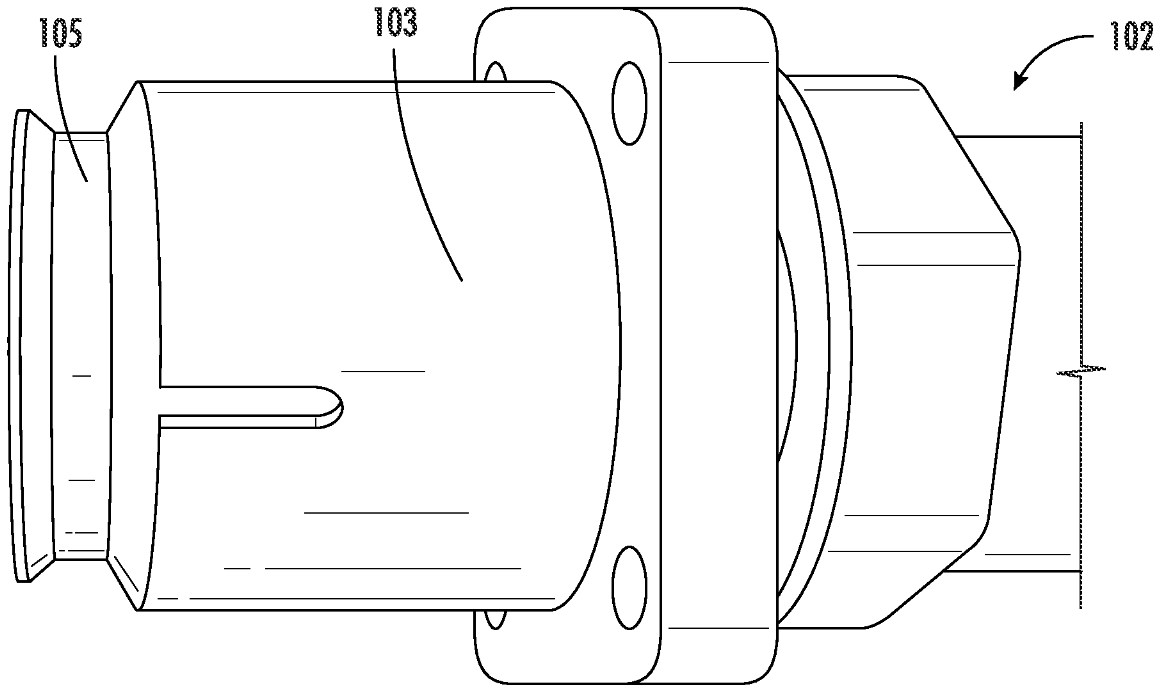
FIG. 1 is a front view of a prior coaxial panel connector suitable for use on equipment.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Figure 2:
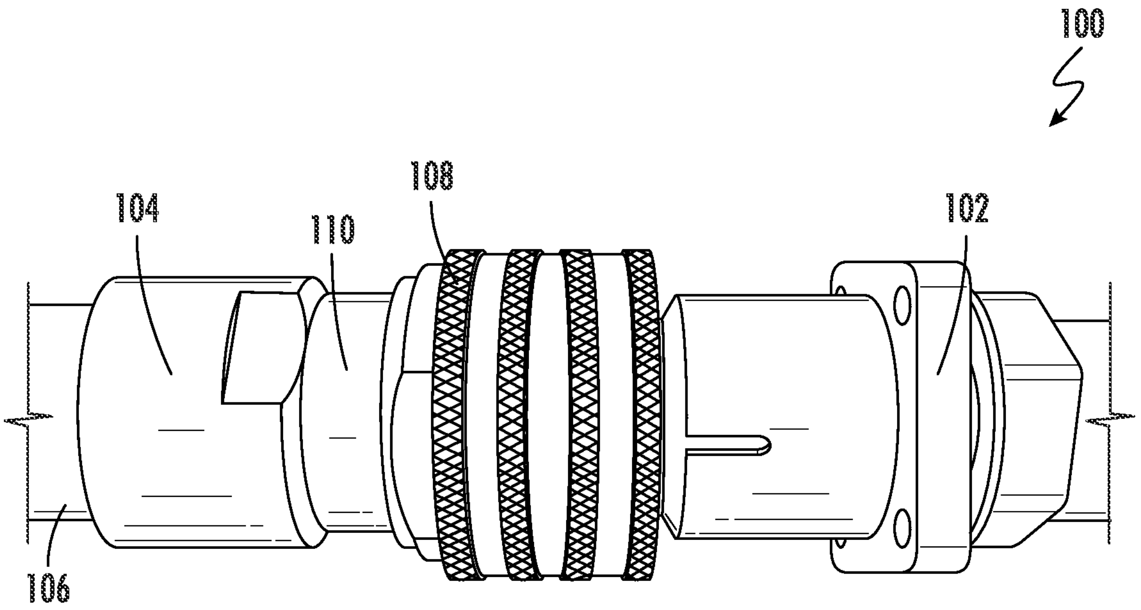
FIG. 2 is a front view of the panel connector of FIG. 1 during mating with a mating coaxial connector, wherein the connectors are shown in an unlocked position.
Figure 3:
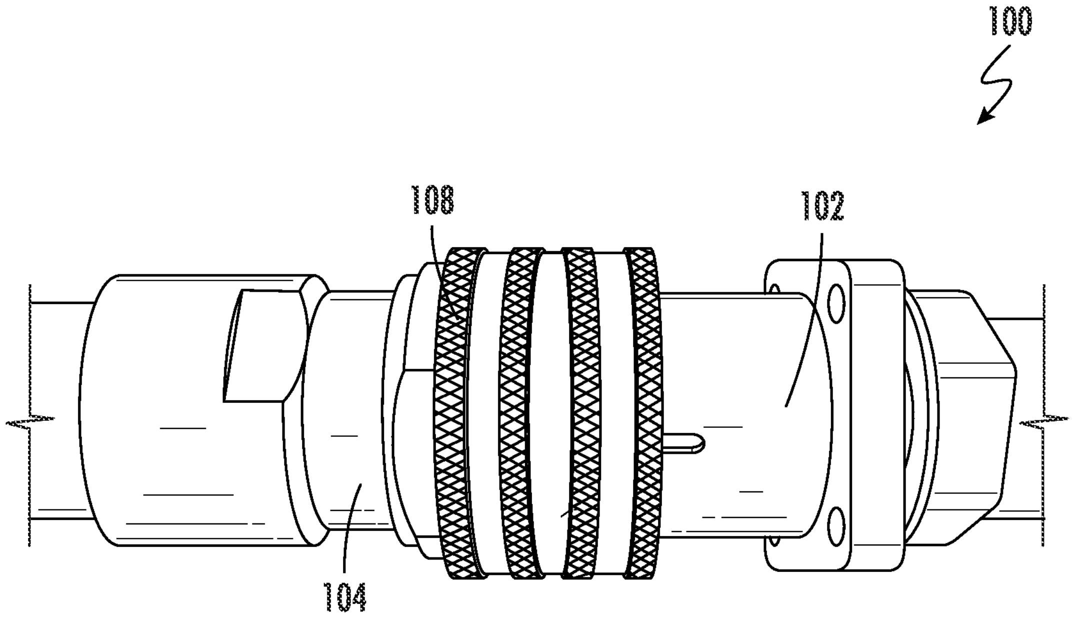
FIG. 3 is a front view of the connectors of FIG. 2 shown in a locked position.

Referring now to the figures, FIGS. 1-3 illustrate a quick-lock coaxial connector assembly, designated broadly at 100. The assembly 100 includes a panel connector 102 that is configured for mounting to a panel or bulkhead (e.g., for telecommunications equipment such as an antenna, a remote radio unit, an amplifier, a filter, etc.), and a connector 104 that serves as a termination for a cable 106 (shown schematically in FIG. 2). The connector 104 includes a coupling sleeve 108 that, in a manner similar to the quick-lock connectors discussed above, slides axially relative to the outer body 110 of the connector 104. When the connector 102 engages the connector 104, the coupling sleeve 108 can be slid axially (i.e., parallel to the longitudinal axis of the outer body 110) relative to the outer body 110 between an unlocked position (FIG. 2) and a locked position (FIG. 3), wherein the connectors 102, 104 are secured to each other. In the unlocked position of FIG. 2, the connectors 102, 104 can be disengaged by pulling the connector 104 away from the connector 102. In the locked position, a locking feature (not shown herein), which may be on the coupling sleeve 108 or within the connector 104 and engaged by the coupling sleeve 108 is received in the groove 105 (or other locking feature) in the outer body 103 of the connector 102, thereby locking the connectors 102, 104 together. More details regarding the structures and operation of various exemplary quick-lock mechanisms are discussed in U.S. Pat. No. 9,893,466 to Wu et al, U.S. Pat. No. 6,645,011 to Schneider and U.S. Pat. No. 7,972,158 to Wild, supra.

As can be seen in FIGS. 2 and 3, the visual appearance of the assembly 100 in the unlocked position and the locked position does not differ significantly. As such, in some instances, a technician connecting the connectors 102, 104 may believe, upon brief visual inspection, that the coupling sleeve 108 is in the proper position for securing the connectors 102, 104 in the locked position, when in fact the coupling sleeve 108 is retracted so that the assembly 100 is in the unlocked position. The inability to readily discern whether the connectors 102, 104 are indeed "locked" can lead to a technician unknowingly leaving the coupling sleeve 108 in the unlocked position of FIG. 2 when the locked position of FIG. 3 is desired. Such improper interconnection may produce poor performance of the connectors 102, 104 (e.g., degraded RF performance, such as poor passive intermodulation (PIM) or return loss performance), or even undesired disengagement of the connectors 102. 104.

Figure 4:
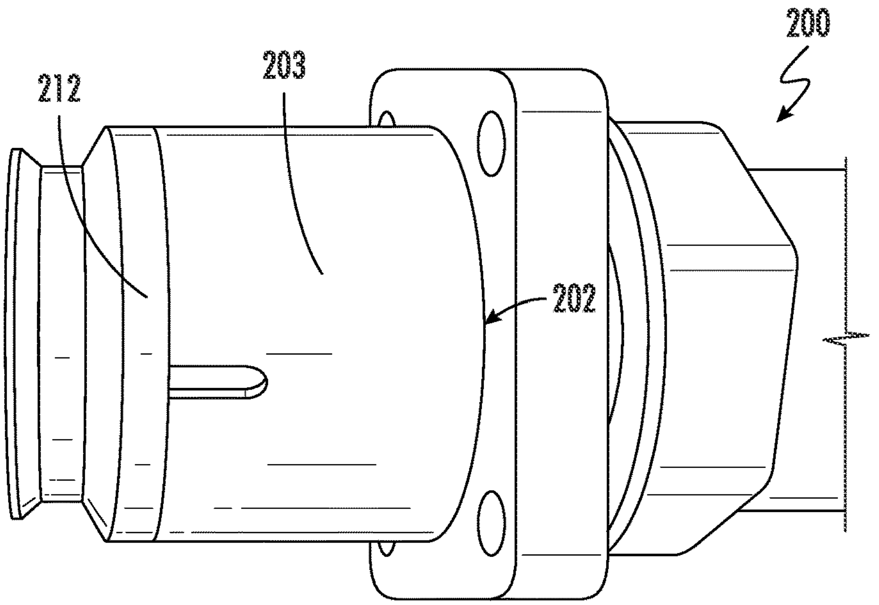
FIG. 4 is a front view of a coaxial panel connector according to embodiments of the invention.
Figure 5:
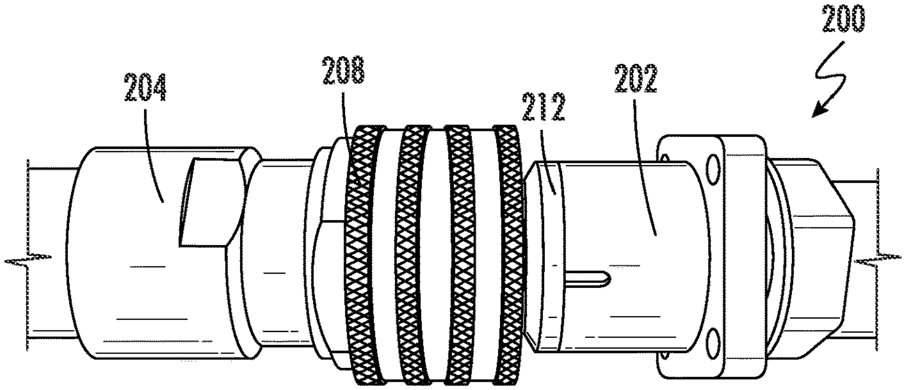
FIG. 5 is a front view of the panel connector of FIG. 4 during mating with a mating coaxial connector, wherein the connectors are shown in an unlocked position, such that the visual indicia is visible.
Figure 6:
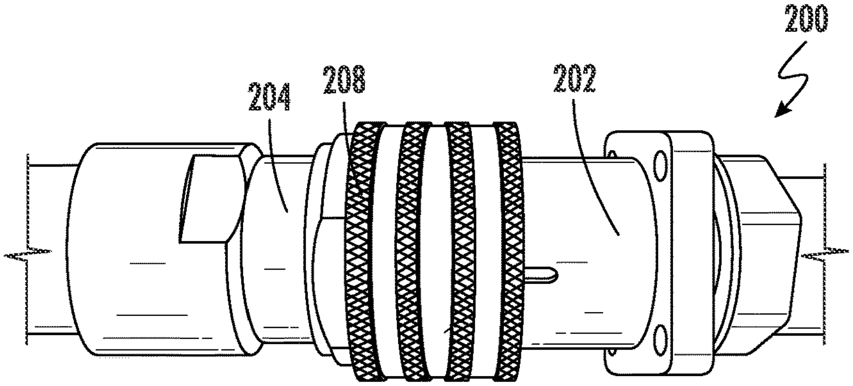
FIG. 6 is a front view of the connectors of FIG. 5 shown in a locked condition, such that the visual indicia is obscured from view.

Referring now to FIGS. 4-6, an assembly 200, which includes connectors 202, 204, is shown therein. The connector 204 is similar to the connector 104 discussed above, with a coupling sleeve 208 that encircles and slides axially relative to an outer body 210. The connector 202 is similar to the panel connector 102, with the exception that the outer body 203 of the connector 202 includes visual indicia 212 on its outer surface. The visual indicia 212, which may be a stripe, patch, strip, ring, text, label, or the like, is positioned on the outer surface of the outer body 203 such that, when the coupling sleeve 208 is in the unlocked position, the coupling sleeve 208 does not overlie the visual indicia, such that the visual indicia 212 is visible, and when the coupling sleeve 208 is in the locked position, the coupling sleeve overlies the visual indicia 212, thereby obscuring the visual indicia from view. As a result, when the assembly 200 is unlocked, a technician can instantly recognize the unlocked state because the visual indicia 212 is visible, and can then proceed to move the coupling sleeve 208 to the locked position if desired.

Those of skill in this art will appreciate that the visual indica 212 may take many forms. The visual indicia 212 may completely encircle the outer body 203, or may only partially or discontinuously encircle the outer body 203. The visual indicia 212 may be a different color (e.g., red or gold) than the remainder of the outer body 203 to provide a striking visual contrast. The visual indicia 212 may be added to the outer body (e.g., as paint, coating, tape, etc.), or may be integral to the outer body 203 (e.g., an etched surface). Other variations will be apparent to those of skill in this art.

Figure 7:
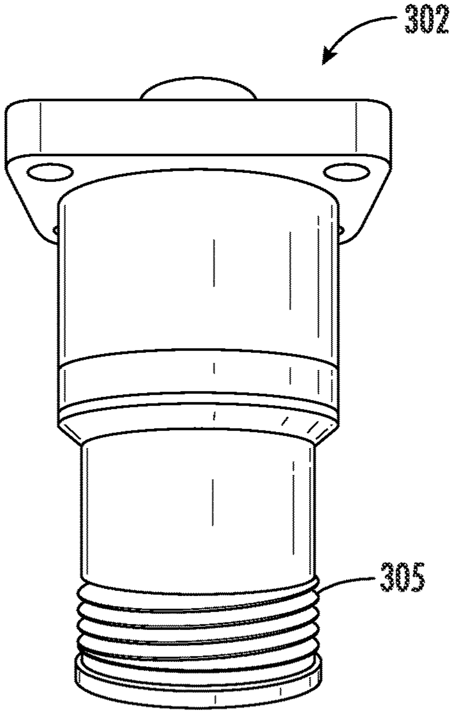
FIG. 7 is a front view of a coaxial panel connector according to further embodiments of the invention.
Figure 8:
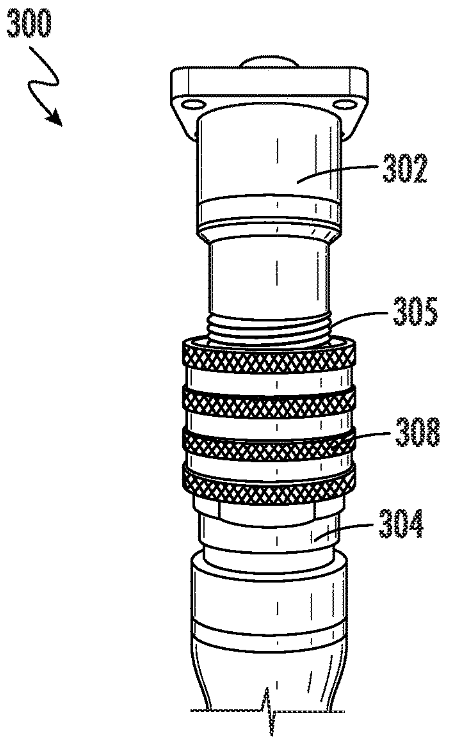
FIG. 8 is a front view of the panel connector of FIG. 7 during mating with a mating coaxial connector, wherein the connectors are shown in an unlocked position, such that the visual indicia is visible.
Figure 9:
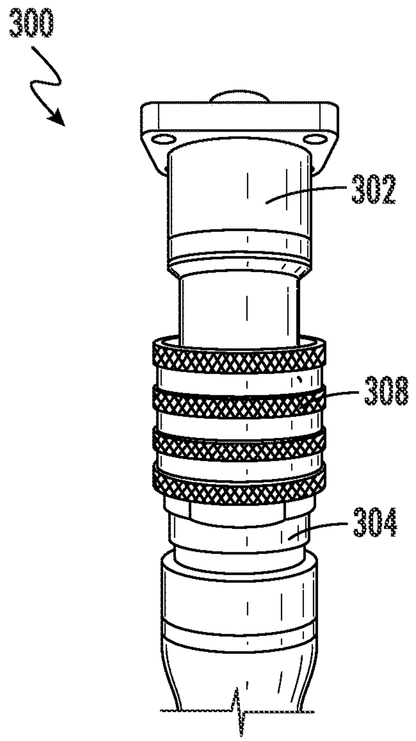
FIG. 9 is a front view of the connectors of FIG. 8 shown in a locked condition, such that the visual indicia is obscured from view.

Referring now to FIGS. 7-9, another quick-lock assembly, designated broadly at 300, is shown therein. The assembly 300 includes a connector 302 that has threads 305 for engaging with the coupling sleeve 308 of a connector 304. As seen in FIGS. 7 and 8, the threads 305 may be coated with a visual indicia 312. In some embodiments the coating may have a visually striking color, such as red, that is immediately distinguishable from the remainder of the connector 302.

As can be seen in FIG. 8, in the unlocked position, the visual indicia 312 is visible. However, as shown in FIG. 9, in the locked position the coupling sleeve 308 overlies the threads 305, and in turn the visual indica 312, thereby obscuring the visual indicia 312 from view. In this manner a technician can easily discern whether the assembly 300 is locked in the locked position or not.

Those of skill in this art will appreciate that the concepts discussed herein may be suitable for quick-lock connectors of a wide variety of configurations. In particular, quick-lock connectors that utilize a coupling sleeve that slides axially to lock and unlock the connectors are suitable. Exemplary connectors include: radio frequency (RF) connectors (such as 4.3/10 and 2.2/5 connectors); power connectors, fiber optic connectors (such as single fiber or multi-fiber push-pull connectors); hybrid fiber/power connectors; and the like.

It is also contemplated that the use of visual indicia on connectors as described above may enable an automated system to detect incorrectly mated connectors.

Some preferred embodiments of the present invention are exemplarily described above in combination with the accompanying drawings. Those of ordinary skill in the art to which the present invention belongs should understand that, specific structures shown in the above embodiments are merely exemplary, rather than limiting. Moreover, those of ordinary skill in the art to which the present invention belongs can combine a variety of technical features shown above according to a variety of possible manners to constitute new technical solutions or make other modifications, and these new technical solutions are encompassed within the scope of the present invention.

That which is claimed is:

1. A connector assembly, comprising:

a first connector having a first outer body, the first outer body including visual indicia on an outer surface thereof, the first outer body including first locking features;

a second connector having a second outer body and a coupling sleeve that is slidable axially relative to the outer body, the second connector including second locking features;

the first connector being configured for mating with the second connector;

wherein, when the first and second connectors are mated, the coupling sleeve is movable between an unlocked position, in which the first and second locking features are not engaged and the first and second connectors can be unmated, and a locked position, in which the coupling sleeve causes engagement of the first and second locking features, thereby preventing unmating of the first and second connectors; and wherein in the unlocked position, the coupling sleeve does not overlie the visual indicia, such that the visual indicia is visible, and in the locked position, the coupling sleeve overlies the visual indicia, such that the visual indicia is obscured from view.

2. The assembly defined in claim 1, wherein the first and second connectors are coaxial connectors.

3. The assembly defined in claim 1, wherein the visual indicia differs in color from the first outer body.

4. The assembly defined in claim 1, wherein the visual indicia comprises a paint or coating added to the first outer body.

5. The assembly defined in claim 1, wherein the visual indicia comprises a label affixed to the first outer body.

6. The assembly defined in claim 1, wherein the visual indicia comprises a ring that encircles the first outer body.

7. The assembly defined in claim 1, wherein the visual indicia is integrated into the outer surface of the first outer body.

8. The assembly defined in claim 1, wherein the first connector is a panel connector mounted on a piece of telecommunications equipment.

9. A connector assembly, comprising:

a first connector mounted on a piece of telecommunications equipment and having a first outer body, the first outer body including visual indicia on an outer surface thereof, the first outer body including first locking features;

a second connector terminating a cable and having a second outer body and a coupling sleeve that is slidable axially relative to the outer body, the second connector including second locking features;

the first connector being configured for mating with the second connector;

wherein, when the first and second connectors are mated, the coupling sleeve is movable between an unlocked position, in which the first and second locking features are not engaged and the first and second connectors can be unmated, and a locked position, in which the coupling sleeve causes engagement of the first and second locking features, thereby preventing unmating of the first and second connectors; and wherein in the unlocked position, the coupling sleeve does not overlie the visual indicia, such that the visual indicia is visible, and in the locked position, the coupling sleeve overlies the visual indicia, such that the visual indicia is obscured from view.

10. The assembly defined in claim 9, wherein the first and second connectors are coaxial connectors.

11. The assembly defined in claim 9, wherein the visual indicia differs in color from the first outer body.

12. The assembly defined in claim 9, wherein the visual indicia comprises a paint or coating added to the first outer body.

13. The assembly defined in claim 9, wherein the visual indicia comprises a label affixed to the first outer body.

14. The assembly defined in claim 9, wherein the visual indicia comprises a ring that encircles the first outer body.

15. The assembly defined in claim 9, wherein the visual indicia is integrated into the outer surface of the first outer body.

16. A connector assembly, comprising:

a first connector mounted on a piece of telecommunications equipment and having a first outer body, the first outer body including visual indicia on an outer surface thereof, the visual indicia being of different color than the outer surface of the first outer body, the first outer body including first locking features;

a second connector having a second outer body and a coupling sleeve that is slidable axially relative to the outer body, the second connector including second locking features;

the first connector being configured for mating with the second connector;

wherein, when the first and second connectors are mated, the coupling sleeve is movable between an unlocked position, in which the first and second locking features are not engaged and the first and second connectors can be unmated, and a locked position, in which the coupling sleeve causes engagement of the first and second locking features, thereby preventing unmating of the first and second connectors; and wherein in the unlocked position, the coupling sleeve does not overlie the visual indicia, such that the visual indicia is visible, and in the locked position, the coupling sleeve overlies the visual indicia, such that the visual indicia is obscured from view.

17. The assembly defined in claim 16, wherein the visual indicia comprises a paint or coating added to the first outer body.

18. The assembly defined in claim 16, wherein the visual indicia comprises a label affixed to the first outer body.

19. The assembly defined in claim 16, wherein the visual indicia comprises a ring that encircles the first outer body.

20. The assembly defined in claim 16, wherein the visual indicia is integrated into the outer surface of the first outer body.

* * * * *